US007548820B2

(12) United States Patent
Urmanov et al.

(10) Patent No.: US 7,548,820 B2
(45) Date of Patent: Jun. 16, 2009

(54) DETECTING A FAILURE CONDITION IN A SYSTEM USING THREE-DIMENSIONAL TELEMETRIC IMPULSIONAL RESPONSE SURFACES

(75) Inventors: Aleksey M. Urmanov, San Diego, CA (US); Anton A. Bougaev, Lafayette, IN (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 196 days.

(21) Appl. No.: 11/588,173

(22) Filed: Oct. 26, 2006

(65) Prior Publication Data

US 2008/0120064 A1     May 22, 2008

(51) Int. Cl.
*G01R 31/00* (2006.01)
*G06F 11/30* (2006.01)

(52) U.S. Cl. .................... 702/58; 702/59; 702/108; 702/109; 702/110; 702/182; 702/185; 324/612; 324/615; 714/25; 714/32

(58) Field of Classification Search ............. 702/58–59, 702/108–110, 117, 182–186; 324/615–619; 700/174, 177; 714/25, 32, 47, 48
See application file for complete search history.

(56) References Cited

U.S. PATENT DOCUMENTS

| 5,410,492 | A | * | 4/1995 | Gross et al. ........... 702/185 |
| 7,191,096 | B1 | * | 3/2007 | Gross et al. ........... 702/182 |
| 2003/0004432 | A1 | * | 1/2003 | Assenheimer ........... 600/547 |
| 2006/0145704 | A1 | * | 7/2006 | Burnett et al. ........... 324/533 |
| 2007/0034206 | A1 | * | 2/2007 | Urmanov et al. ......... 126/585 |
| 2007/0226554 | A1 | * | 9/2007 | Greaves et al. .......... 714/724 |
| 2008/0046559 | A1 | * | 2/2008 | Langer et al. ........... 709/224 |

OTHER PUBLICATIONS

Schuster et al., Dynamic system characterization of enterprise servers via nonparametric identification, Jun. 8, 2005, IEEE, vol. 4, pp. 2756-2761.*
Whisnant et al., Efficient Signal Selection for Nonlinear System-Based Models of Enterprise Servers, Mar. 27, 2006, IEEE, pp. 141-148.*
Vichare et al., Prognostics and health management of electronics, Mar. 2006, IEEE, vol. 29, pp. 222-229.*
Gross, Kenny C., Electronic Prognostics, Jan. 23, 2006, Sun Microsystems, Power Point Presentation, pp. 1-34.*

* cited by examiner

*Primary Examiner*—Edward Raymond
*Assistant Examiner*—Mi'schita' Henson
(74) *Attorney, Agent, or Firm*—Park, Vaughan & Fleming LLP

(57) ABSTRACT

One embodiment of the present invention provides a system that facilitates high-sensitivity detection of an anomaly in telemetry data from an electronic system using a telemetric impulsional response fingerprint of the telemetry data. During operation, the system applies a sudden impulse step change to one or more operational parameters of the electronic system during operation. Next, the system generates a three-dimensional (3D) telemetric impulsional response fingerprint (TIRF) surface from a dynamic response in the telemetry data to the sudden impulse step change. The system then determines from the 3D TIRF surface whether the telemetry data contains an anomaly.

18 Claims, 5 Drawing Sheets

DETECTING A FAILURE CONDITION IN A SYSTEM USING THREE-DIMENSIONAL TELEMETRIC IMPULSIONAL RESPONSE SURFACES

RELATED APPLICATION

The subject matter of this application is related to the subject matter in a co-pending non-provisional application by inventors Aleksey M. Urmanov, Anton A. Bougaev, and Kenny C. Gross, entitled "Method and Apparatus for Generating a Telemetric Impulsional Response Fingerprint for a Computer System," having Ser. No. 11/203,361, and filing date 11 Aug. 2005. This patent application is hereby incorporated by reference.

BACKGROUND

1. Field of the Invention

The present invention relates to techniques for enhancing reliability and availability within computer systems. More specifically, the present invention relates to a method and an apparatus for proactively monitoring computer system components for faults by using three-dimensional telemetric impulsional response fingerprint (3D TIRF) surfaces in combination with a two-dimensional Sequential Probability Ratio Test (2D SPRT).

2. Related Art

As information technologies become more prevalent, organizations, such as businesses and governments, are increasingly relying on enterprise computing systems to process ever-larger volumes of electronic transactions. A failure in one of these enterprise computing systems can be disastrous, potentially resulting in millions of dollars of losses in productivity and business. More importantly, a failure can seriously undermine consumer confidence in a business, making customers less likely to purchase goods and services from the business. Hence, it is desirable to detect and prevent these failures before the failures actually occur.

To protect against catastrophic system failures, modern computer server systems are typically equipped with a significant number of sensors which monitor signals during operation of the computer systems. Results from this monitoring process can be used to generate time series data for these signals which can subsequently be analyzed to determine how well a computer system is operating.

One of the conventional techniques for detecting impending faults is to employ threshold limit rules while monitoring system variables such as temperature, voltage, current, RPM, etc. This technique generates an alarm condition if a variable level starts to move out of a predetermined range. However, such threshold-limit techniques suffer from transient signal noise which frequently causes false alarms when noise spikes activate alarms. In order to deal with this problem, a statistical Sequential Probability Ratio Test (SPRT) technique has been recently developed to detect impending faults by analyzing monitored time-domain signals. This technique has achieved not only reduced false-alarm probability but also reduced missed-alarm probability.

Unfortunately, both the threshold-limit and the SPRT techniques have a serious limitation: they are passive. In other words, they do not actively probe or perturb conditions of the components under surveillance. Although these techniques can catch many types of faults, other latent faults may appear only in response to dynamic stimulation. An analogy for these latent faults is a car that may have a problem during acceleration. This problem may not reveal itself during idling or while the car is cruising at a uniform speed.

As a remedy to the above limitation, an active-probing technique referred to as Telemetric Impulsional Response Fingerprint (TIRF) has been introduced to facilitate the dynamic assessment of the health of electronic components. Specifically, this technique introduces a subtle perturbation to an electronic component during operation through one or more signal inputs, and then generates the TIRF of the component for one or more observed physical and software variables. Next, the TIRF is compared with a reference TIRF produced from the certified good electronic components of the same type. If the distance between the monitored TIRF and the reference TIRF exceeds a specified threshold, an alarm will be generated.

However, one problem with the TIRF technique is that if the specified threshold distances are set too low, false alarms can arise from spurious data values in the monitored TIRF. To avoid such false alarms, the threshold distances to the corresponding TIRFs can be set higher. However, a higher threshold distance allows degradation within the monitored system to develop further before an alarm occurs.

Hence, what is needed is a method for achieving higher-sensitivity in detecting subtle incipient of failure mechanisms using the TIRF technique without the above-described problems.

SUMMARY

One embodiment of the present invention provides a system that facilitates high-sensitivity detection of an anomaly in telemetry data from an electronic system using a telemetric impulsional response fingerprint of the telemetry data. During operation, the system applies a sudden impulse step change to one or more operational parameters of the electronic system during operation. Next, the system generates a three-dimensional (3D) telemetric impulsional response fingerprint (TIRF) surface from a dynamic response in the telemetry data to the sudden impulse step change. The system then determines from the 3D TIRF surface whether the telemetry data contains an anomaly.

In a variation on this embodiment, the system determines from the 3D TIRF surface whether the telemetry data contains an anomaly by: generating a reference 3D TIRF surface for the 3D TIRF surface; computing a residual response surface between the 3D TIRF surface and the reference TIRF surface; and determining from the residual response surface whether the telemetry data contains an anomaly.

In a further variation on this embodiment, the system generates the reference 3D TIRF surface for the 3D TIRF surface by: receiving a certified electronic system of the same type as the electronic system, wherein the certified electronic system is guaranteed to operate normally; applying the same sudden impulse step change to the same one or more operational parameters of the certified electronic system; and generating the reference 3D TIRF surface to the sudden impulse step change from a dynamic response in the corresponding telemetry data from the certified electronic system.

In a further variation, the system computes the residual response surface by subtracting the reference 3D TIRF surface from the 3D TIRF surface.

In a variation on this embodiment, the system generates the 3D TIRF surface by: producing a two-dimensional (2D) time-domain TIRF from the dynamic response in the telemetry data to the sudden impulse step change; and computing a complex transfer function of the 2D time-domain TIRF, wherein the complex transfer function represents the 3D TIRF surface in a complex plane.

In a further variation, the system determines from the residual response surface whether the telemetry data contains an anomaly by applying a 2D Sequential Probability Ratio Test (SPRT) to the residual response surface.

In a further variation on this embodiment, the system applies the 2D SPRT to the residual response surface by performing two parallel one-dimensional (1D) SPRT tests along each direction of the residual response surface.

In a further variation, the complex transfer function can be obtained by using a z-transform or a Fourier-transform.

DETAILED DESCRIPTION

Figure 1:
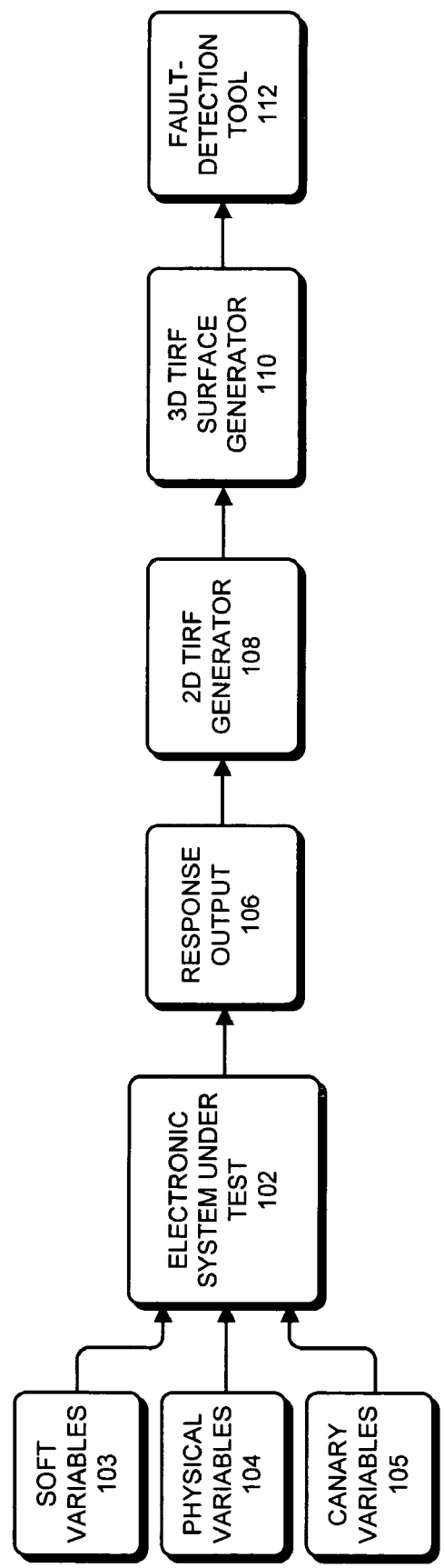
FIG. 1 illustrates an electronic system under test 102 in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device that can store code and/or data for use by a computer system. This includes, but is not limited to, volatile memory, non-volatile memory, magnetic and optical storage devices such as disk drives, magnetic tape, CDs (compact discs) or DVDs (digital versatile discs or digital video discs).

Overview

The telemetric impulsional response fingerprint (TIRF) technique is a unique "active probing" technique which leverages continuous system telemetry to provide dynamic, multivariate "fingerprints" for a computer field replaceable unit (FRU). These fingerprints can be used to recognize very subtle failure precursors, such as aging processes, degrading sensors, delamination of bonded components, solder-joint cracking, deterioration of socket connectors, and other mechanisms which may not show up during conventional ongoing reliability testing (ORT) or reliability quality testing (RQT) test sequences.

The referenced TIRF technique "pings" a monitored system with a sudden step change or an impulse in one or more system variables (e.g. CPU load, voltage, memory demand, etc.) and records dynamic responses to the perturbation from one or more telemetry variables associated with the system. The dynamic responses are then used to generate two-dimensional (2D) (time-domain) TIRF which indicates the dynamic health of the monitored system.

The present invention extends the referenced 2D TIRF technique by transforming the time-domain TIRF into a three-dimensional (3D) TIRF surface in a complex plane which comprises a real axis ("Re" hereinafter) and an imaginary axis ("Im" hereinafter). Moreover, the present invention obtains a 3D residual response surface by subtracting a "reference" 3D TIRF surface (obtained from a system known to have no degradation) from the 3D TIRF surfaces obtained from systems under surveillance or undergoing manufacturing Qualification Testing.

Furthermore, the obtained 3D residual response surface is then automatically examined using a multi-dimensional Sequential Probability Ratio Test (SPRT), in particular, a 2D SPRT. As a result, by combining the 3D TIRF surface with the 2D SPRT detection, the present invention facilitates a high-sensitivity detection of subtle anomalies with an excellent avoidance of false alarm problem in the referenced TIRF technique.

Electronic System Under Test

FIG. 1 illustrates an electronic system under test 102 in accordance with an embodiment of the present invention. During operation, electronic system under test 102 can receive soft variables 103, physical variables 104, and canary variables 105 as input variables. Soft variables 103 can include metrics such as load, throughput, and transaction latencies. These variables are typically derived from the operating system of electronic system under test 102. Physical variables 104 include temperature, voltage, current, and vibration within electronic system under test 102. Canary variables 105 include synthetic user-transactions and quality of performance values for these synthetic transactions.

In one embodiment of the present invention, the system applies a sudden impulse change to one or more of the input variables. For example, one or more voltages applied to the system can be changed, or the load applied from the canary variables can be stepped up to a maximum value for a predetermined period of time to stress the system.

In response to the sudden impulse from the input variables, electronic system under test 102 produces dynamic responses in one or more of its telemetry variables, which can also include both physical and soft variables. The dynamic responses can be monitored and recorded using a telemetry harness to generate response output 106. In one embodiment of the present invention, response output 106 is generated using a Continuous System Telemetry Harness (CSTH).

Next, 2D TIRF generator 108 performs an operation on response output 106 to generate 2D TIRFs according to the technique described in the reference application. 3D TIRF surface generator 110 is then used to produce 3D TIRF surfaces from the 2D TIRFs.

Finally, fault-detection tool 112 processes the 3D TIRF surfaces to detect an incipient of system degradation and set off an alarm if a fault is found. In one embodiment of the present invention, fault-detection tool 112 performs a 2D SPRT on the input 3D TIRF surfaces.

Generating a 3D TIRF Surface from a 2D TIRF

Figure 2:
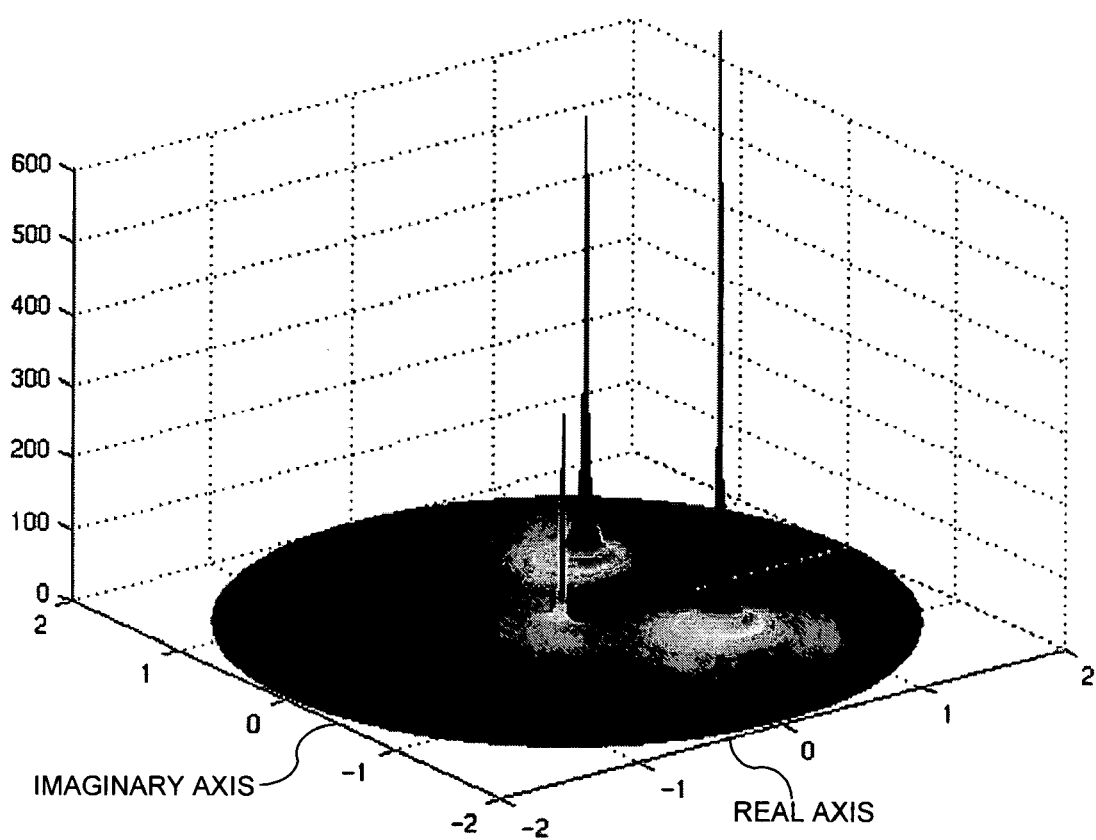
FIG. 2 illustrates an exemplary 3D TIRF surface produced from a voltage signal of a server power supply in accordance with an embodiment of the present invention.

The 2D TIRFs in the time domain are used to generate 3D TIRF surfaces. In one embodiment of the present invention, building a 3D TIRF surface involves computing a complex transfer function for a 2D time-domain TIRF. It would be apparent to one of ordinary skill in the art that a number of techniques can produce complex transfer functions from time-domain signals. For example, one can use a z-transform to compute a complex transfer function H(z) for a 2D TIRF, wherein the magnitude of the complex transform function |H(z)| generates a 3D surface in the complex z-plane. We refer to this 3D surface in the complex z-plane as a 3D TIRF surface. Note that other types of transfer function can also produce a complex 3D TIRF surface, for example, by using a Fourier-transform. FIG. 2 illustrates an exemplary 3D TIRF surface produced from a voltage signal of a server power supply in accordance with an embodiment of the present invention. Note that the 3D surface is computed over a complex plane comprising a real axis and an imaginary axis.

If humans are to examine the 3D TIRF surface in FIG. 2 for an anomaly, one could first observe the 3D surface and then compare that to reference 3D TIRF surfaces produced from normal power supplies to see if the 3D TIRF surface is the same or different from good ones. However, such comparisons are not only time-consuming but also subject to human error. Hence, it is desirable to perform automatic detection of anomalies on the generated 3D TIRF surfaces.

Producing a Residual Responses Surface Using a Reference TIRF Surface

In one embodiment of the present invention, instead of detecting anomalies in an original 3D TIRF surface directly, a "residual" response surface (RSS) is generated from the original 3D TIRF surface which is then evaluated for anomalies. More specifically, the RSS is obtained by subtracting a reference 3D TIRF surface from the original 3D TIRF surface. This reference 3D TIRF surface is obtained from one or more "golden" systems of the same type as the system under test, wherein the golden systems have been certified to be defect free. In one embodiment of the present invention, the reference 3D TIRF surface is obtained by taking an average of a set of reference 3D TIRF surfaces obtained from multiple golden systems. Hence the reference surface represents a mean value for the original 3D TIRF in the transfer function |H(z)| at all Re and Im values in the complex z-plane.

Note that a reference surface is obtained in the same manner as the original 3D TIRF surface, which includes applying the same sudden impulse step change to the same input parameters of a golden system, producing a 2D TIRF from the same telemetry variables, and computing a transfer function of the 2D TIRF to generate the reference 3D TIRF surface using the same transformation.

Note that once the reference 3D TIRF surface is generated and stored, the 3D TIRF surfaces for any test system of the same type can be continuously subtracted from the reference 3D TIRF surface to create a series of RSS.

Performing 2D SPRT Tests on the RSS

Sequential Probability Ratio Test (SPRT) is a well-known technique for monitoring time-series signals. The SPRT method monitors sequential values in a time series and continuously applies a binary hypothesis test to decide if the process is normal or if it is degraded. More specifically, a SPRT catches an anomaly (a possible failure condition) in a system by monitoring trends in system values over time. By monitoring the values over time, the SPRT averages out transient values like noise spikes that might activate an alarm in a more simplistic method of monitoring (such as a method that uses threshold limits). Because the SPRT is not affected by transient signals, tighter effective tolerances can be defined for system monitoring, thereby enabling a system to generate a warning before conditions become as critical as with threshold-based monitoring techniques.

One embodiment of the present invention uses a 2D SPRT to analyze the residual surfaces. Instead of applying SPRT to time-series signals, the present invention applies two one-dimensional (1D) SPRT simultaneously across both the Re and Im dimensions of an RSS.

For example, at a location along the real axis Re=$Re_1$, a first SPRT test is applied to the sequence of values in the Im-direction: ($Re_1$, $Im_1$), ($Re_1$, $Im_2$), ($Re_1$, $Im_3$), . . . , ($Re_1$, $Im_N$). Similarly, this SPRT is also applied to the locations Re=$Re_2$, $Re_3$, . . . , $Re_N$.

At the same time, at a location along the imaginary axis Im=$Im_1$, a second SPRT test is applied to the sequence of values in the Re-direction: ($Re_1$, $Im_1$), ($Re_2$, $Im_1$), ($Re_3$, $Im_1$), . . . , ($Re_N$, $Im_1$). Similarly, the second SPRT is also applied to the locations Im=$Im_2$, $Im_3$, . . . , $Im_N$.

Thus, every grid point on the RSS is evaluated by two separate SPRT tests. The system then determines if any of the SPRTs detects a failure condition in the RSS. If so, the system issues an alarm for detecting an anomaly in the system. It has been found that applying this 2D SPRT technique on the RSS can substantially improve the sensitivity for detection of subtle anomalies in the original 2D TIRF while avoiding the large false alarm rates inherent in the prior art, threshold-based RRS approaches.

Process of Detecting a Failure Condition in a System

Figure 3:
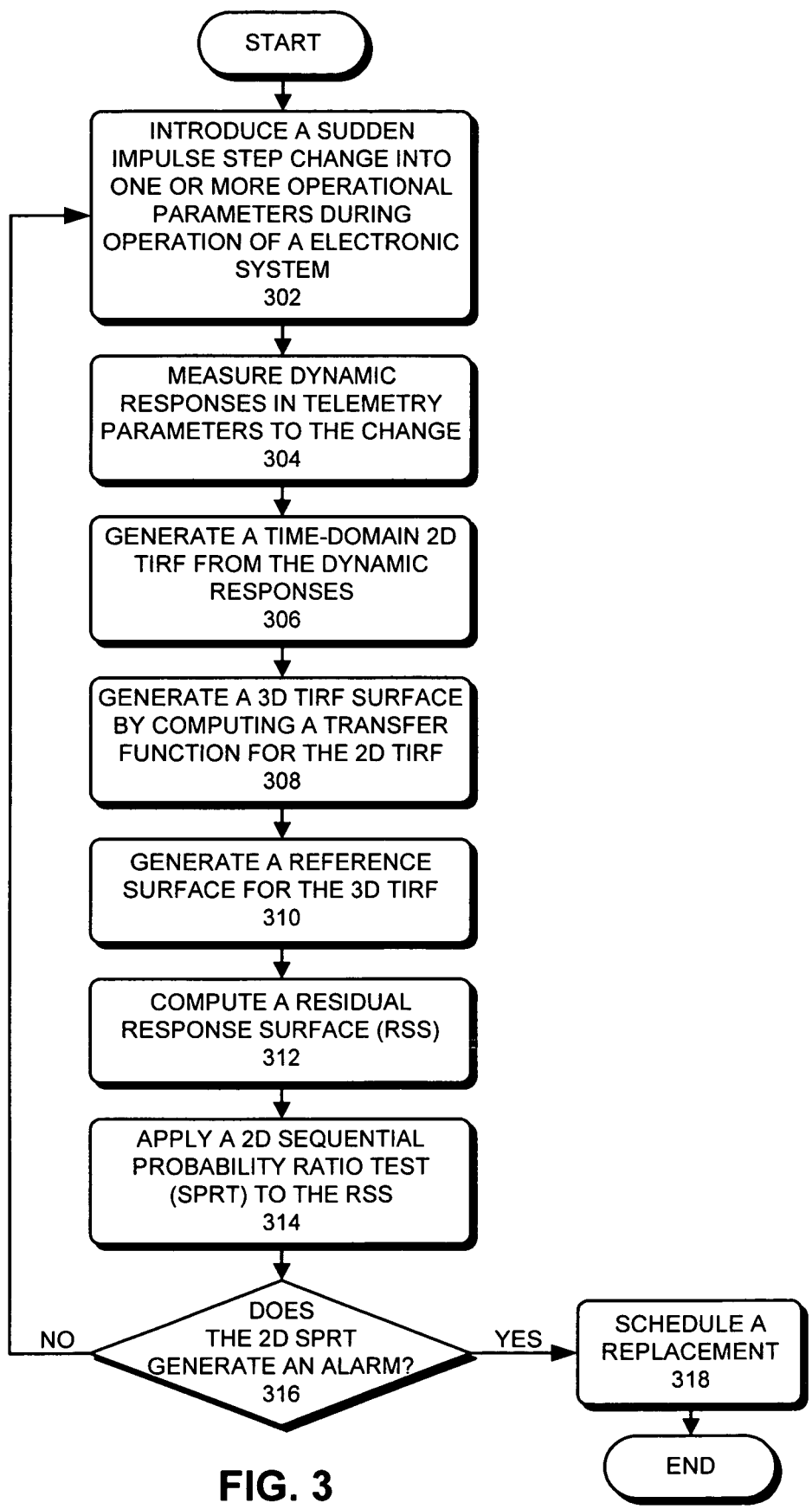
FIG. 3 presents a flowchart illustrating the process of detecting a failure condition in an electronic system using a 3D TIRF surface in accordance with an embodiment of the present invention.

FIG. 3 presents a flowchart illustrating the process of detecting a failure condition in an electronic system using a 3D TIRF surface in accordance with an embodiment of the present invention.

During the detection process, the system starts by introducing a sudden impulse step change into one or more operational parameters of the electronic system during the electronic system operation (step 302). Next, the system measures dynamic responses of one or more telemetry parameters following the sudden impulse step change (step 304). The system then generates time-domain (2D) TIRF from the dynamic responses (step 306). Note that steps 302-306 are described in more detail in the related application.

Next, the system generates a 3D TIRF surface in a complex plane by computing a complex transfer function from the time-domain TIRF (step 308). In one embodiment, the transfer function is obtained by using a z-transform.

The system next generates a reference 3D TIRF surface for the 3D TIRF surface from certified good electronic systems of the same type as the monitored system (step 310). The system subsequently computes a residual response surface (RSS) by subtracting the reference 3D TIRF surface from the 3D TIRF surface (step 312).

Next, the system applies a 2D SPRT to the RSS, which involves performing two parallel 1D SPRT tests along each direction of the RSS (step 314). The system then determines if the monitored parameters contain an anomaly by monitoring if any alarm is generated from the 2D SPRT (step 316). If so, the system determines that the electronic system under test is faulty and can subsequently schedule a replacement or repair (step 318). Otherwise, the system returns to step 302 and continues the detecting process.

An Illustrative Example

One application of this present invention facilitates high-sensitivity detection of degraded electronic components within high-end enterprise computing servers. It has been observed that a variety of failure modes for components in the high-end servers show up first as anomalies in the aforementioned response surfaces.

As an example, we look at a set of DC/DC converters in high-end servers wherein the set of converters comprises both good and degraded components.

A subset of certified good converters is used to build a reference 3D TIRF surface. Specifically, we apply a sudden impulsive temperature change to each known good converter and record the 2D TRIF response in the output voltage of the converter. Next, the 2D TIRF responses of these good converters are transformed into 3D TIRF surfaces. The average of these 3D TIRF surfaces is then used to define the reference 3D TIRF surface.

Next, the remaining good and degraded converters are measured to produce corresponding 3D TIRF surfaces. Specifically, we apply the same sudden impulsive temperature changes to each converter and acquire the dynamic response of the converter voltage output in the time domain. The measured voltage outputs in the time domain are used to build 3D TIRF surfaces.

Finally, the corresponding residual response surfaces (RSS) are computed by subtracting the reference 3D TIRF from the individual 3D TIRF surfaces.

Figure 4A:
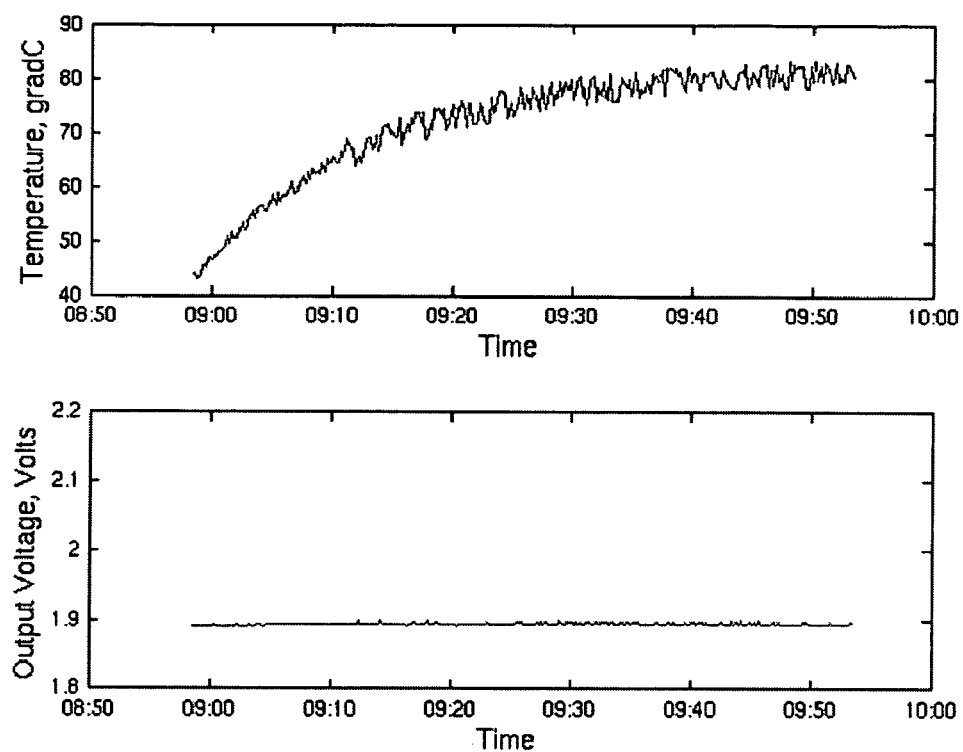
FIG. 4A illustrates the time domain voltage response of a typical good DC/DC converter to a series of temperature changes in accordance with an embodiment of the present invention.
Figure 4B:
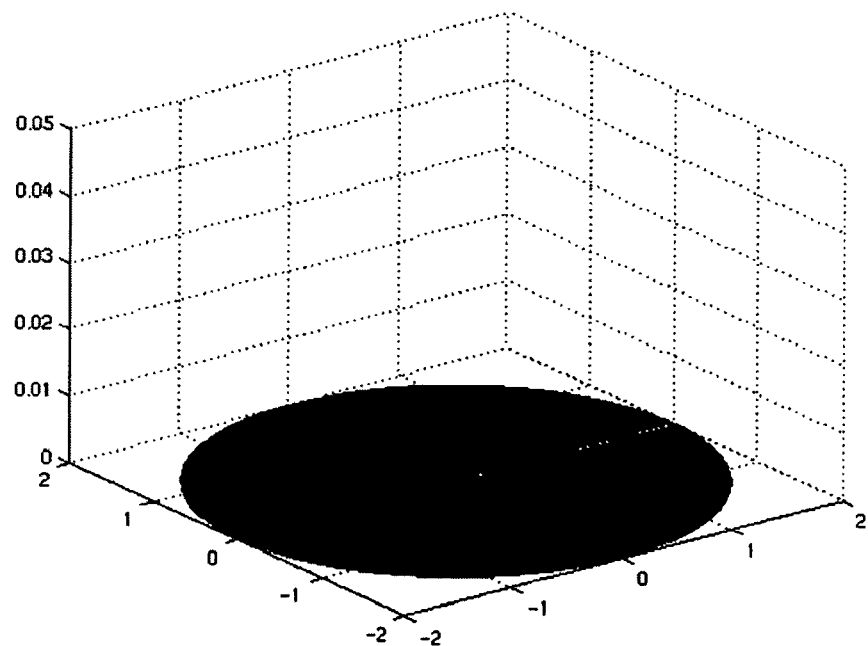
FIG. 4B illustrates the corresponding RSS of the good converter in accordance with an embodiment of the present invention.

FIG. 4A illustrates the time domain voltage response of a typical good DC/DC converter to a series of temperature changes in accordance with an embodiment of the present invention, and FIG. 4B illustrates the corresponding RSS of the good converter in accordance with an embodiment of the present invention. Note that when the system is operating normally (indicated by a flat voltage response in FIG. 4A), the values contained in the RSS are very small and reflect only random process and measurement noise at each Re or Im location.

Figure 5A:
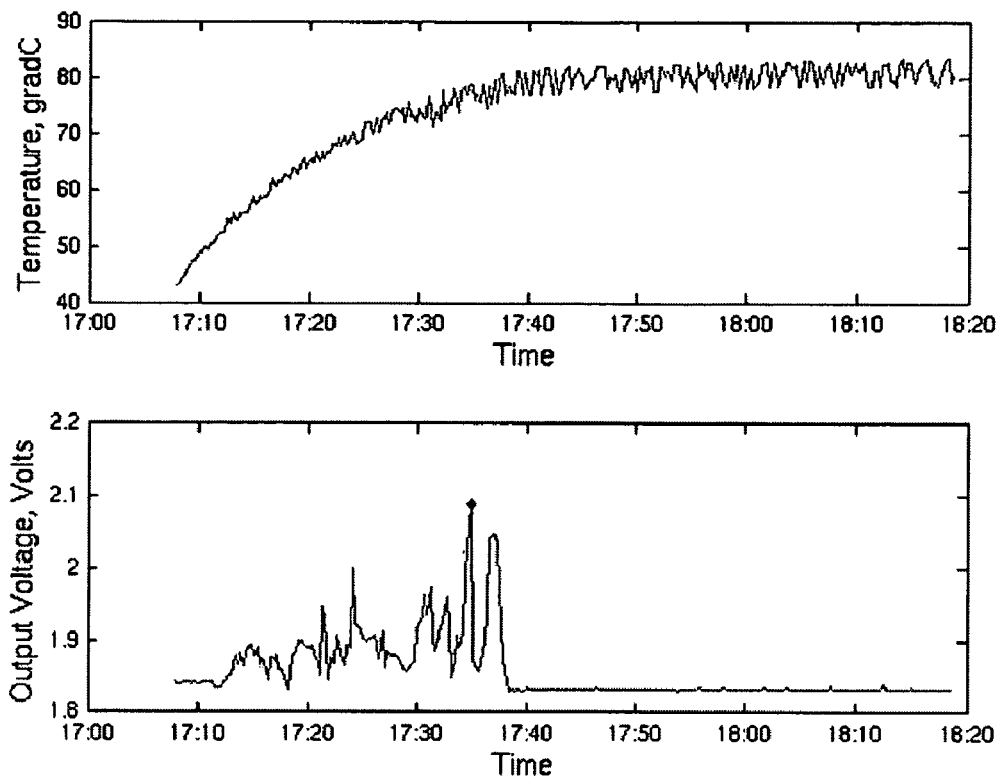
FIG. 5A illustrates the time domain voltage response of a known degraded DC/DC converter in accordance with an embodiment of the present invention.
Figure 5B:
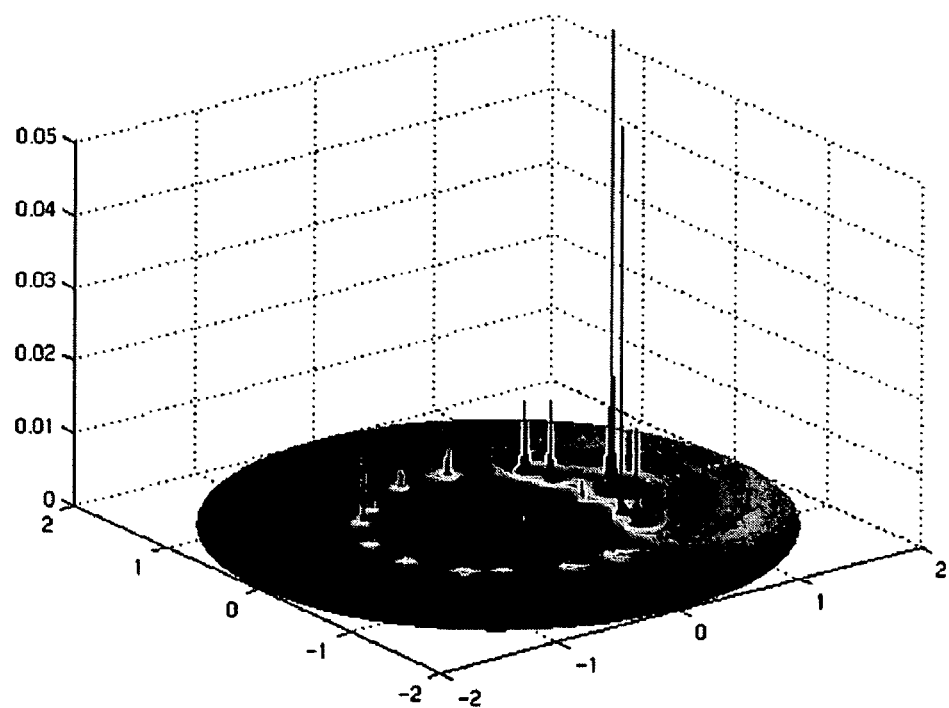
FIG. 5B illustrates the corresponding RSS of the degraded converter in accordance with an embodiment of the present invention.

In comparison, FIG. 5A illustrates the time domain voltage response of a known degraded DC/DC converter in accordance with an embodiment of the present invention, and FIG. 5B illustrates the corresponding RSS of the degraded converter in accordance with an embodiment of the present invention. Note that the response from the bad converter is noticeably different from a good RSS.

However, instead of using human judgment, we now apply the 2D SPRT procedure in the both Re and Im directions on the RSS in FIG. 5B to automatically detect anomalies with high-sensitivity and good avoidance of false alarms.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating high-sensitivity detection of an anomaly in telemetry data from an electronic system using a telemetric impulsional response fingerprint of the telemetry data, the method comprising:
   applying a sudden impulse step change to one or more operational parameters of the electronic system during operation;
   generating a three-dimensional (3D) telemetric impulsional response fingerprint (TIRF) surface from a dynamic response in the telemetry data associated with the one or more operational parameters to the sudden impulse step change; and
   determining from the 3D TIRF surface whether the telemetry data contains an anomaly, which involves:
      generating a reference 3D TIRF surface for the 3D TIRF surface;
      computing a residual response surface between the 3D TIRF surface and the reference TIRF surface; and
      determining from the residual response surface whether the telemetry data contains an anomaly.

2. The method of claim 1, wherein generating the reference 3D TIRF surface for the 3D TIRF surface involves:
   receiving a certified electronic system of the same type as the electronic system, wherein the certified electronic system is guaranteed to operate normally;
   applying the same sudden impulse step change to the same one or more operational parameters of the certified electronic system; and
   generating the reference 3D TIRF surface to the sudden impulse step change from a dynamic response in the corresponding telemetry data from the certified electronic system.

3. The method of claim 1, wherein computing the residual response surface involves subtracting the reference 3D TIRF surface from the 3D TIRF surface.

4. The method of claim 1, wherein generating the 3D TIRF surface involves:
   producing a two-dimensional (2D) time-domain TIRF from the dynamic response in the telemetry data to the sudden impulse step change; and
   computing a complex transfer function of the 2D time-domain TIRF, wherein the complex transfer function represents the 3D TIRF surface in a complex plane.

5. The method of claim 4, wherein the complex transfer function can be obtained by using:
   a z-transform; or
   a Fourier-transform.

6. The method of claim 1, wherein determining from the residual response surface whether the telemetry data contains an anomaly involves applying a 2D Sequential Probability Ratio Test (SPRT) to the residual response surface.

7. The method of claim 6, wherein applying the 2D SPRT to the residual response surface involves performing two parallel one-dimensional (1D) SPRT tests along each direction of the residual response surface.

8. A computer-readable storage medium storing instructions that when executed by a computer cause the computer to perform a method for facilitating high-sensitivity detection of an anomaly in telemetry data from an electronic system using a telemetric impulsional response fingerprint of the telemetry data, the method comprising:
   applying a sudden impulse step change to one or more operational parameters of the electronic system during operation;
   generating a three-dimensional (3D) telemetric impulsional response fingerprint (TIRF) surface from a dynamic response in the telemetry data associated with the one or more operational parameters to the sudden impulse step change; and
   determining from the 3D TIRF surface whether the telemetry data contains an anomaly, which involves:
      generating a reference 3D TIRF surface for the 3D TIRF surface;
      computing a residual response surface between the 3D TIRF surface and the reference TIRF surface; and determining from the residual response surface whether the telemetry data contains an anomaly.

9. The computer-readable storage medium of claim 8, wherein generating the reference 3D TIRF surface for the 3D TIRF surface involves:
receiving a certified electronic system of the same type as the electronic system, wherein the certified electronic system is guaranteed to operate normally;
applying the same sudden impulse step change to the same one or more operational parameters of the certified electronic system; and
generating the reference 3D TIRF surface to the sudden impulse step change from a dynamic response in the corresponding telemetry data from the certified electronic system.

10. The computer-readable storage medium of claim 8, wherein computing the residual response surface involves subtracting the reference 3D TIRF surface from the 3D TIRF surface.

11. The computer-readable storage medium of claim 8, wherein generating the 3D TIRF surface involves:
producing a two-dimensional (2D) time-domain TIRF from the dynamic response in the telemetry data to the sudden impulse step change; and
computing a complex transfer function of the 2D time-domain TIRF, wherein the complex transfer function represents the 3D TIRF surface in a complex plane.

12. The computer-readable storage medium of claim 11, wherein the complex transfer function can be obtained by using:
a z-transform; or
a Fourier-transform.

13. The computer-readable storage medium of claim 8, wherein determining from the residual response surface whether the telemetry data contains an anomaly involves applying a 2D Sequential Probability Ratio Test (SPRT) to the residual response surface.

14. The computer-readable storage medium of claim 13, wherein applying the 2D SPRT to the residual response surface involves performing two parallel one-dimensional (1D) SPRT tests along each direction of the residual response surface.

15. An apparatus that facilitates high-sensitivity detection of an anomaly in telemetry data from an electronic system using a telemetric impulsional response fingerprint of the telemetry data, comprising:
an excitation mechanism configured to apply a sudden impulse step change to one or more operational parameters of the electronic system during operation;
a generation mechanism configured to generate a three-dimensional (3D) telemetric impulsional response fingerprint (TIRF) surface from a dynamic response in the telemetry data associated with the one or more operational parameters to the sudden impulse step change; and
a determination mechanism configured to determine from the 3D TIRF surface whether the telemetry data contains an anomaly,
wherein the determination mechanism is further configured to:
generate a reference 3D TIRF surface for the 3D TIRF surface;
compute a residual response surface between the 3D TIRF surface and the reference TIRF surface; and
determine from the residual response surface whether the telemetry data contains an anomaly.

16. The apparatus of claim 15, wherein the determination mechanism is further configured to:
receive a certified electronic system of the same type as the electronic system, wherein the certified electronic system is guaranteed to operate normally;
apply the same sudden impulse step change to the same one or more operational parameters of the certified electronic system; and to
generate the reference 3D TIRF surface to the sudden impulse step change from a dynamic response in the corresponding telemetry data from the certified electronic system.

17. The apparatus of claim 15, wherein the generation mechanism is configured to:
produce a two-dimensional (2D) time-domain TIRF from the dynamic response in the telemetry data to the sudden impulse step change; and to
compute a complex transfer function of the 2D time-domain TIRF, wherein the complex transfer function represents the 3D TIRF surface in a complex plane.

18. The apparatus of claim 15, wherein the determination mechanism is further configured to apply a 2D Sequential Probability Ratio Test (SPRT) to the residual response surface.

* * * * *